United States Patent [19]

Edwards

[11] Patent Number: 4,479,617

[45] Date of Patent: Oct. 30, 1984

[54] TAPE MEASURE CONSTRUCTION INCORPORATING A MODIFIED TAPE HOOK BUMPER

[75] Inventor: Richard L. Edwards, Cary, N.C.

[73] Assignee: Cooper Industries, Inc., Houston, Tex.

[21] Appl. No.: 434,145

[22] Filed: Oct. 13, 1982

[51] Int. Cl.³ .......................................... B65H 75/48
[52] U.S. Cl. .................................. 242/107; 242/84.8; 33/138
[58] Field of Search ................ 242/84.8, 107, 107.2, 242/107.3; 33/138, 139, 140, 137 R, 137 L; 16/86 A

[56] References Cited

U.S. PATENT DOCUMENTS

| | | | |
|---|---|---|---|
| 2,153,896 | 4/1939 | Mohar | 16/86 A |
| 3,519,220 | 7/1970 | Zelnick | 242/107.2 |
| 3,521,831 | 7/1970 | Schmidt | 242/84.8 |
| 3,578,259 | 5/1971 | Zelnick | 242/107.2 |
| 4,153,996 | 5/1979 | Rutty | 242/84.8 |

FOREIGN PATENT DOCUMENTS 690458 4/1953 United Kingdom ................ 33/138

*Primary Examiner*—John M. Jillions
*Attorney, Agent, or Firm*—Wigman & Cohen

[57] ABSTRACT

A tape measure construction comprising a casing, a tapeline coiled within the casing, a tape retaining hook attached to the leading end of the tapeline, apparatus for automatically retracting the tapeline into the casing, and a resilient deformable bumper for preventing the tape retaining hook from slamming into the casing as the tapeline is retracted into the casing is disclosed. The tape bumper is constructed of a resilient, deformable material and comprises a main body section and a tape retaining hook engaging section, defining an open space or aperture therebetween. The front face of the bumper hook engaging portion is convex in shape, in order that as the flat surface of the tape hook engages the bumper, the bumper deforms progressively to cushion and absorb the shock of impact of the tape hook slamming against the measuring tape casing, by progressively increasing the resistance to deformation, thus progressively increasing the shock absorbing effect thereof.

14 Claims, 3 Drawing Figures

TAPE MEASURE CONSTRUCTION INCORPORATING A MODIFIED TAPE HOOK BUMPER

BACKGROUND OF THE INVENTION

1. Field of the Invention

The present invention relates in general to tape measure constructions, and more specifically to a modified tape hook bumper for cushioning the recoil shock as the tape measure is retracted into its case and the tape hook strikes the tape bumper to limit the retraction of the tape within the casing.

2. Description of the Prior Art

Tape measure constructions having automatic, stress-wound return springs for automatically retracting the tape measure back into the casing are well known. These tape measure constructions are generally formed with a tape hook affixed to the leading end of the measuring tape for attaching onto an object to be measured and for preventing the tape from being fully retracted into the tape casing. Some tape measure constructions incorporate a tape return button for selectively retracting the tape into the casing, and otherwise controlling the return speed of the tape. Generally, users of such tape measures have no interest in controlling the return speed of the tape into the casing. As a consequence, in this type of tape measure construction and in the type having no return button, the entire tape is retracted into the casing at full speed, slamming the tape hook into the casing. When this happens, the tape hook frequently bends under impact, the rivets holding the tape hook to the leading end of the tape will shear the rivet and rip the rivet loose from either the tape or the tape hook, frequently splitting the tapeline in the process.

Attempts have been made to cushion this impact by providing bumpers of various sorts mounted at the mouth of the opening of the tape casing. These bumpers generally have flat faces for engaging the tape hook, and have taken the form of both spring metal strips and rubber or plastic resilient bumpers, some having coil, leaf or other type of metallic spring material formed between two sections of the resilient material to permit greater movement of the outer piece of resilient bumper material as it is struck by the tape hook. These bumper constructions have necessarily been complicated, in that they are formed of at least two pieces of resilient material with metallic spring(s) positioned therebetween, with this bumper mechanism positioned in a channel having guide grooves in which the outer resilient member of the bumper travels upon impact by the tape hook. Necessarily, the requirement of these many intricate parts in the tape measure bumper increase the overall production costs of, and render it quite difficult to replace this combination bumper mechanism in the event of mechanical failure.

BRIEF DESCRIPTION OF THE DRAWING

For a detailed description of the preferred embodiment of the invention, reference is made to the accompanying drawings, in which.

DETAILED DESCRIPTION OF THE INVENTION

Figure 1:
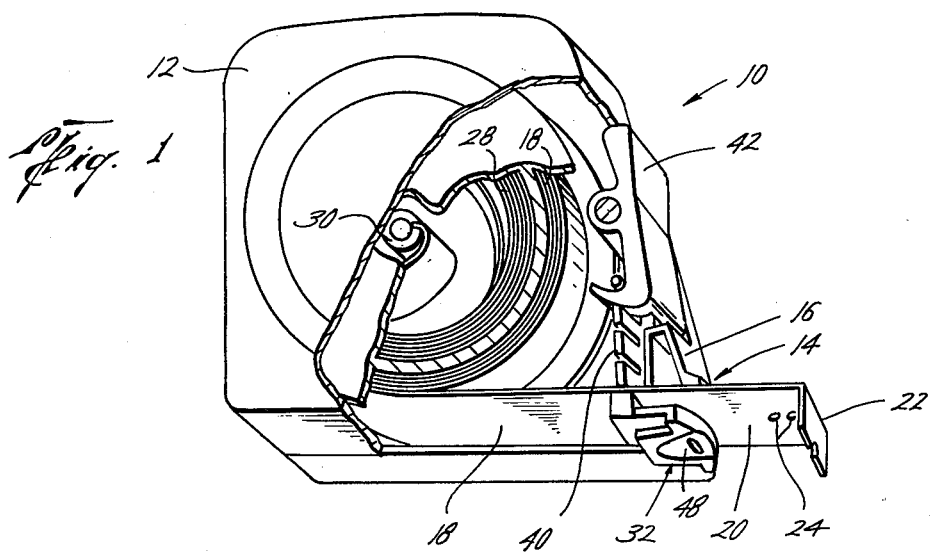
FIG. 1 is a pictorial view of the tape measure construction of the present invention.

Turning now to the drawings and more specifically to FIG. 1, the tape measure construction of the present invention is shown, generally illustrated by the numeral 10. The tape measure constructon 10 includes a casing 12 having an aperture or opening 14 at the lower corner of the front face 16 thereof. A flexible tapeline 18 is coiled within the casing 12 in a manner to be extracted therefrom through the front face aperture 14. The tapeline 18 has a leading edge 20 to which is affixed a tape retaining hook 22 by rivets 24 or the like in a manner to shift a distance equal to the thickness of the retaining hook material in order to accurately measure inside and outside dimensions.

Opposite the leading end 20 of the flexible tapeline 18 is the trailing end thereof (not clearly shown) which is affixed to a coiled stress-wound return spring 28 for retracting the tapeline into the casing 12. The return spring 28 is affixed to a central post 30 formed in the casing 12 in a manner customarily known to those skilled in the art.

Figure 2:
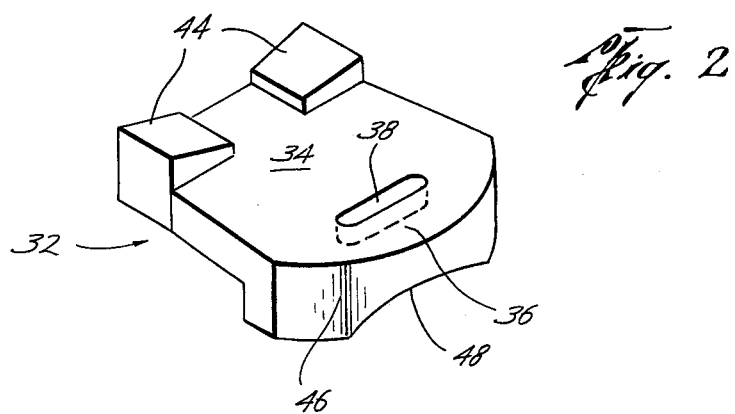
FIG. 2 is a pictorial view of the modified tape hook bumper of the tape measure construction of the present invention.

The tape measure construction of the present invention includes a resilient, deformable bumper 32 mounted in the casing 12 at the lower edge of the aperture 14 to be in the path of the tape hook 22 as the tapeline is being retracted into the casing 12. The bumper 32 is adapted to cushion the impact of the tape hook 22 as the tape hook engages the edge of the casing aperture 14 to prevent the tapeline from being fully retracted into the casing. As is best shown in FIG. 2, the tape hook bumper 32 comprises a main body portion 34 having an essentially elongate tape hook engaging portion 36 formed therewith to define an aperture 38 therebetween. The tape hook engaging portion 36 is oriented with its longitudinal axis transverse to the path of travel of the tape hook. The tape hook engaging portion 36 is formed with the main body portion 34 at respective ends of the portion 36 to define an essentially elongated oval aperture 38 having opposing essentially straight longer sides parallel to the tape hook engaging portion. In the preferred embodiment, the tape hook engaging portion 36 is formed of thicker material than the main body portion 34 in order to increase the structural integrity of the bumper 32 yet retain its functional resiliency and flexibility.

As best shown in FIG. 1, the tape hook bumper herein also includes a recess 48 formed on the underside thereof. This recess permits the user to more easily grasp the tape hook with thumb or finger in order to withdraw the tapeline from the casing.

The tape measure construction 10 of the present invention may also include a locking mechanism for selectively locking the tapeline in extended position. As best shown in FIG. 1, this locking mechanism may comprise a generally vertically reciprocating locking plate 40 which is actuated by a cam lock type pivoting actuator 42. These members operate in a well known manner to selectively lock the tapeline 18 in an extended position as desired.

In this regard, the tape hook bumper 32 of the present invention may include mating inclined support portions 44 formed with the bumper main body section 34 in a manner to engage the underside surface of the tapeline and oppose the force of the locking plate 40 and grasp the tapeline to retain the tapeline in the selected extended position.

Figure 3:
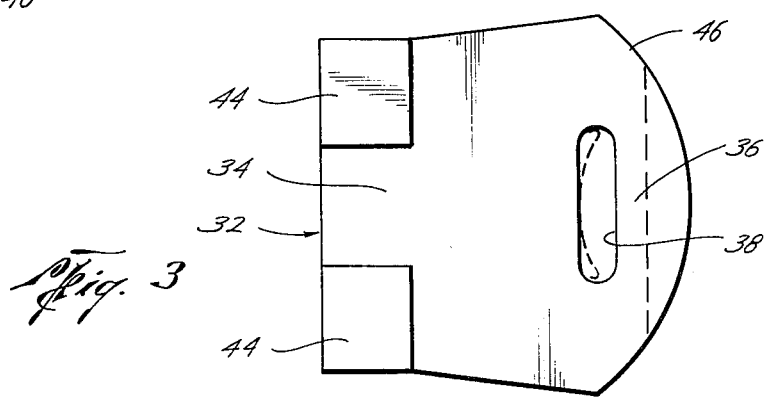
FIG. 3 is a top view of the modified tape hook bumper showing the deformation thereof under impact.

In operation, the tapeline is withdrawn from the casing and used in the customary manner. Upon retraction of the tapeline into the casing, the tape retaining hook impacts against the bumper. The backside of the tape retaining hook is essentially flat, and causes the bumper to deform in the manner shown by the dotted lines in FIG. 3. The preferred embodiment of the tape bumper includes a convex hook engaging surface 46. Those skilled in the art will readily appreciate that, due to this convex shape, the initial point of contact of the flat tape hook with the bumper surface 46 is intially a theoretical point contact in two dimension, a vertical line contact in three dimension with the tape construction oriented as shown in FIG. 1, with the surface of contact gradually increasing as the bumper bends and deforms into the position shown in dotted lines in FIG. 3. It will also be apparent to those skilled in the art that the force resistance of the bumper to deformation is proportional to the amount of deformation up until the point where the two opposing sides of the oval slot 38 of the bumper engage one another.

An important aspect of the modified tape hook bumper of the tape measure of the present invention is that the thickness of the bumper tape hook engaging portion 36 remains essentially the same throughout deformation. Additionally, the modified tape hook bumper herein may be constructed of much more durable deformable plastic or rubber, because the cushioning effect is provided by the shape of the bumper, including the convex leading edge and the relief slot, whereas prior art devices were constructed of softer, less durable and faster deteriorating rubber, or were constructed of harder more durable rubber or plastic, having little deformation and cushioning effect.

Although particular embodiments of the invention have been illustrated in the accompanying drawings and description in the foregoing Detailed Description of the Invention, it will be understood that the invention is not limited to the embodiments disclosed, but is intended to embrace any alternatives, modifications, rearrangements and/or substitutions of elements as fall within the scope of the invention.

I claim:

1. A measuring tape construction, comprising:
   a. a casing having a front wall and an opening in said front wall;
   b. a tapeline coiled within said casing, said tapeline having a first end extending from said casing front wall opening;
   c. a tape retaining hook attached to said tapeline first end;
   d. retracting means for retracting said tapeline into said casing except for said tape retaining hook; and
   e. a resilient, deformable bumper mounted with said casing adjacent said opening in the path of said tape retaining hook to prevent said hook from slamming against said casing, said bumper comprising:
      (1) a main body portion and
      (2) a tape retaining hook engaging portion formed with said main body portion defining an aperture between said engaging portion and said pody portion, said tape retaining hook engaging portion having a convex surface for contacting the tape retaining hook,
   whereby said tape retaining hook engaging portion bends to cushion the impact of said hook striking said engaging portion following retraction.

2. The measuring tape construction as set forth in claim 1, wherein said tape retaining hook engaging portion is essentially elongate and is oriented with its longitudinal axis transverse to the path of travel of said tape hook.

3. The measuring tape construction as set forth in claim 2, wherein said bumper aperture is essentially elongate in shape and is oriented parallel to said tape retaining hook engaging portion.

4. The measuring tape construction as set forth in claim 3, wherein said bumper includes a recess formed on the underside of said main body portion and said tape retaining hook engaging portion in order to facilitate manual grasping of said tape retaining hook.

5. The measuring tape construction as set forth in claim 4, wherein said bumper further includes mating support portions formed with said main body portion for selectively engaging and supporting said tapeline.

6. The measuring tape construction as set forth in claim 5, wherein respective upper surfaces of said mating support portions are inclined to conform to the shape of the underside engaging surface of said tapeline.

7. The measuring tape construction as set forth in claim 6, wherein said bumper aperture is essentially oval in shape.

8. The measuring tape construction as set forth in claim 7, wherein said bumper aperture takes the form of an elongated oval having opposing essentially straight longer sides thereof.

9. The measuring tape construction as set forth in claim 8, wherein said bumper is deformable under impact of said hook striking said engaging and, the thickness of said tape retaining hook engaging portion in the direction of deformation remains essentially uniform during deformation.

10. A measuring tape construction having a casing, a tapeline coiled within the casing and having a first end extending from an opening in the casing, a tape retaining hook attached to the tapeline first end, retracting means for retracting all of the tapeline except for the tapeline first end into the casing, and a resilient deformable bumper mounted to the casing adjacent the opening, said bumper comprising:
   a main body portion, and
   a tape retaining hook contacting portion, said hook contacting portion being a unitary elongate element extending transversely to the direction of travel of the tape hook and being integrally connected at each end thereof to said main body portion so as to define an aperture between said portions;
   said hook contacting portion having a surface for contacting the tape hook, said surface being convex;
   whereby the force resistance of the bumper to deformation is proportional to the amount of deformation of the tape retaining hook contacting portion up to the point where the tape retaining hook contacting portion contacts the main body portion.

11. The measuring tape construction as set forth in claim 10, wherein said bumper aperture is essentially elongate in shape and is oriented parallel to said tape retaining hook contacting portion.

12. The measuring tape construction as set forth in claim 10, wherein said bumper aperture is essentially oval in shape.

13. The measuring tape construction as set forth in claim 10, wherein said bumper aperture takes the form of an elongated oval having opposing essential straight longer sides thereof.

14. The measuring tape construction as set forth in claim 10, wherein resistance to deformation of the hook contacting portion increases with the amount of deformation of the portion.

* * * * *

UNITED STATES PATENT AND TRADEMARK OFFICE
CERTIFICATE OF CORRECTION

PATENT NO. : 4,479,617
DATED : Oct. 30, 1984
INVENTOR(S) : RICHARD L. EDWARDS

It is certified that error appears in the above—identified patent and that said Letters Patent is hereby corrected as shown below:

Claim 1, column 3, line 65 change "pody" to --body--.

Claim 9, column 4, line 36, after "engaging" insert --portion--; and after "and" delete --,--.

Signed and Sealed this

Twenty-fifth Day of June 1985

[SEAL]

Attest:

DONALD J. QUIGG

Attesting Officer

Acting Commissioner of Patents and Trademarks